3,025,186
METHOD OF PROCESSING AN OFFSET RUBBER BLANKET

Frederik Johannes Eekhout, Segbroeklaan 526, The Hague, Netherlands, and Gerrit Jan Lutje Wooldrik, Enschede, Netherlands
No Drawing. Filed Nov. 18, 1958, Ser. No. 774,584
Claims priority, application Netherlands May 27, 1958
9 Claims. (Cl. 117—139)

In the conventional offset printing methods an image carrier is used, consisting of metal or another suitable material, the surface portions of which that are to print the image accept the printing ink, whereas the portions that are not to take up printing ink are hydrophilic and are wetted by water. In order to facilitate the taking up of water the image carrier may be grained. The image carrier is inked by means of an inking roller while a moist roller is also run in contact with the cylinder.

The image carrier is subsequently contacted with a cylinder covered with a fine rubber blanket. The ink of the image is taken up by the rubber blanket and is subsequently given off to the paper, which runs over a third roller which is pressed against the roller covered with the rubber blanket.

In actual practice the following difficulties are encountered in the offset process:

(1) Oily materials and rubber dissolve in each other to some extent. In addition rubber is always somewhat porous. The above circumstances have for their result that not all of the ink present on the image carrier is given off to the paper. In actual practice this is referred to as the "double splitting of the ink into threads" (threads which are formed by the breaking off of the ink between the image carrying cylinder and the rubber and subsequently between the rubber and the paper). If it is tried to increase the amount of ink given off to the paper by supplying more ink to the image carrying cylinder, the ink will be rolled out, which causes blotching.

(2) The porous rubber blanket also has the tendency to adsorb part of the water when coming into contact with the water carrying portions of the image carrier. Mostly the paper is dusty; the dust will be taken up by the moist rubber so that the rubber and consequently also the image carrier will be fouled. This will result in the hydrophilic portions of the image carrier taking up some ink in the long run, so that the paper will receive printing ink in places where it is not desired. If it is tried to meet this defect by applying more water to the image carrier the rubber blanket will in turn also absorb more water and more paper dust will stick to the rubber, so that an improvement is not achieved.

Since the dirt reduces the surface tension between the water and the fatty printing ink, the tendency of the water to emulsify in the printing ink and conversely is increased. This will have for its result that the color quality of the printing ink will decrease and the printing will become pale.

(3) As is known, paper is rather hygroscopic. Consequently it will absorb water from the rubber blanket during the printing, so that the paper will expand, while upon drying it shrinks again. Especially in multi-color printing it is of great importance for this expansion and shrinking to be limited to a minimum, because a superimposed color should accurately register with a color already present.

For all these reasons the presence of water on the rubber blanket will cause uncertainties in the printing process. It is desirable, therefore, to so process the rubber surface that it will absorb as little water as possible, which can be achieved by reducing the porosity of the rubber. The rubber should retain its affinity for fatty printing ink, but the printing ink and the rubber should as little as possible dissolve in each other. Consequently a closed surface must be formed which absorbs little or no water and which gives off substantially all of the ink to the paper.

According to the invention this object is achieved by treating the surface of the rubber blanket with a preparation which contains as its essential components a polyester, an isocyanate or polyisocyanate, a cellulose ester, more particularly nitrocellulose, and an organic solvent for these substances, the blanket thus treated being dried at elevated temperature.

The preparation is applied to the rubber blanket after the surface thereof has been cleaned e.g. by means of ethylacetate and/or butylacetate. Said liquids may also be used as organic solvents in the above-mentioned composition.

After the application of the preparation to the rubber blanket this is dried by heat, which is preferably provided by infra-red irradiation. During this irradiation, condensation of the polyester with the isocyanate or the polyisocyanate will take place which will result in the formation of polyurethane resins.

After one treatment the layer formed is generally still too thin. It is advisable, therefore, to repeat the treatment a few times.

In view of the condensation referred to above the preparations used according to the invention are not stable. They can be kept for only about 2 hours and the components, therefore, should be mixed only shortly before the treatment.

By the treatment according to the invention the following advantages are obtained:

(a) Better prints are produced: each line stands out very clearly.

(b) The blanket needs less cleaning and the time spent thereon may be actually reduced to one tenth.

(c) The rate of printing may be increased and the number of revolutions of the rollers may therefore be raised. The improvement in output relative to known methods may be as high as 250% in the case of paper which is difficult to print.

(d) Because the ink is given off substantially completely to the paper from the image carrying cylinder by the intermedium of the rubber blanket, an appreciable economy in printing ink is achieved, namely from 20–40%. The economy is largest in the case of expensive inks rich in pigment.

(e) It is possible to obtain good results with cheaper kinds of paper which so far were not or not very suited for offset printing. In this case too there is a reduced tendency of the ink to run (which causes thick lines or points) and an accurate register of the colors relatively to one another is obtained.

(f) The life of the blanket is lengthened, inter alia, because the oil of the printing ink does not dissolve in the rubber.

(g) The rubber blanket may be cleaned for removing ink residues without affecting the processed surface. Cleaning may be effected e.g. with kerosine or with a mixture of water, kerosine and gasoline. However, care should be taken not to treat the blanket with sharp objects, e.g. pumice stone.

The rubbing of the blanket with talcum powder at the end of the day's work, as is usual in the case of ordinary rubber blankets, may be omitted; it even appears to have an adverse effect.

The method according to the invention may be carried out as follows:

The blanket is stretched about a large motor-driven roller. Beneath the roller a flat tray is placed which contains a liquid of the following composition:

50 g. of a commercial product known under the trade name Definal M, consisting of a solution of a polyester of 3 mols adipic acid, 3 mols 1,4-butylene glycol and 1 mol hexane triole, which has been subjected to a preliminary condensation with 2,4-toluylene diisocyanate, said solution containing an addition of 7% of a very finely divided silica pigment.

40 g. of a commercial product known under the trade name Definal G.K. which has essentially the same composition as Definal M, but does not contain a pigment.
830 g. ethylacetate.
830 g. butylacetate.
35 g. triphenylmethane-4,4',4"-triisocyanate.
15 g. of a 15% solution of nitrocellulose in acetone.

The above-mentioned substances are intimately mixed, so that a homogeneous solution is obtained.

After the blanket has been stretched about the roller it is cleaned with a mixture of ethylacetate and butylacetate. The blanket is run once through the flat tray, after which it is dried by means of infra-red lamps arranged over the roller. During this treatment the condensation of the polyester and the diisocyanate takes place.

The above treatment is twice repeated in the same manner. The tray with liquid is now removed, whereupon the roller is run three more times along the infra-red lamps. The blanket is taken from the roller and left alone for 48 hours, whereupon it is ready for use.

The distance between the infra-red lamps and the roller may be e.g. 30–40 cm. The blanket should be heated uniformly throughout and consequently a large number of infra-red lamps distributed over the surface of the blanket is used. For the same reason it is also desirable to carry out the treatment of the blanket with the preparation mechanically; a layer applied by hand is not uniform and a rubber blanket thus prepared produces non-uniform prints.

We claim:

1. A method of producing an offset rubber blanket of improved characteristics, which comprises applying to a surface of a rubber blanket adapted for use for offset printing at least one coating of a solution of a polyester of adipic acid with butylene glycol and hexane triol, a polyisocyanate, and a nitro cellulose ester, in an organic solvent therefor, and drying the blanket thus treated at an elevated temperature.

2. A method as defined in claim 1, wherein the polyisocyanate is a polyisocyanate selected from the group consisting of 2,4-toluylene diisocyanate and triphenylmethane-4,4',4"-triisocyanate.

3. A method as defined in claim 1, wherein the organic solvent is ethyl acetate.

4. A method as defined in claim 1, wherein the organic solvent is butyl acetate.

5. A method as defined in claim 1, wherein drying is effected by infra-red irradiation.

6. A method as defined in claim 1, wherein the blanket is washed with ethyl acetate prior to application of said solution.

7. A method as defined in claim 1, wherein the blanket is washed with butyl acetate prior to application of said solution.

8. An offset rubber blanket coated with the in situ reaction product of a mixture of a polyester of adipic acid with butylene glycol and hexane triol, a polyisocyanate of the group consisting of 2,4-toluylene diisocyanate and triphenylmethane-4,4',4"-triisocyanate, and a nitro cellulose ester.

9. An offset rubber blanket coated with the in situ reaction product of a mixture of a polyester of adipic acid with butylene glycol and hexane triol, a diisocyanate, and a nitro cellulose ester.

References Cited in the file of this patent

UNITED STATES PATENTS

| | | |
|---|---|---|
| 403,942 | Kogge | May 28, 1889 |
| 1,761,814 | Bruson | June 3, 1930 |
| 2,260,143 | Juve | Oct. 21, 1941 |
| 2,410,361 | Prance | Oct. 29, 1946 |
| 2,503,209 | Nyquist et al. | Apr. 4, 1950 |
| 2,850,464 | Mitchell | Sept. 2, 1958 |
| 2,874,068 | Spulak | Feb. 17, 1959 |